United States Patent [19]

Hatazawa

[11] Patent Number: 4,564,302

[45] Date of Patent: Jan. 14, 1986

[54] CONTROL DEVICE FOR PRINTER WHICH HAS FUNCTION OF FORMAT DATA PRINTING

[75] Inventor: Kikuo Hatazawa, Atsugi, Japan

[73] Assignee: Hitachi, Ltd., Tokyo, Japan

[21] Appl. No.: 551,910

[22] Filed: Nov. 15, 1983

[30] Foreign Application Priority Data

Nov. 15, 1982 [JP] Japan .................... 57-200086

[51] Int. Cl.[4] .............................. B41J 5/30
[52] U.S. Cl. ...................... 400/76; 400/279
[58] Field of Search ............ 400/17, 76, 279, 282; 273/85 G, 313; 340/724, 726, 734, 800

[56] References Cited

U.S. PATENT DOCUMENTS

| | | | |
|---|---|---|---|
| 3,801,961 | 4/1974 | Coombe | 340/724 |
| 4,045,789 | 8/1977 | Bristow | 273/85 G X |
| 4,112,422 | 9/1978 | Mayer et al. | 273/85 G X |
| 4,116,444 | 9/1978 | Mayer et al. | 273/313 |
| 4,125,829 | 11/1978 | Kayashima | 340/800 X |
| 4,145,043 | 3/1979 | Olliges | 273/313 X |
| 4,200,869 | 4/1980 | Murayama et al. | 340/723 |
| 4,324,401 | 4/1982 | Stubben et al. | 273/85 G |
| 4,403,301 | 9/1983 | Fessel | 400/279 X |
| 4,445,114 | 4/1984 | Stubben | 340/726 |

OTHER PUBLICATIONS

IBM Technical Disclosure Bulletin, "Format Control Functions," Adam et al., vol. 25, No. 1, Jun. 1982, pp. 217-220.

Primary Examiner—Ernest T. Wright, Jr.
Attorney, Agent, or Firm—Antonelli, Terry & Wands

[57] ABSTRACT

A printer control device reading out printing data and format data stored separately from each other for superposing these data to send these data to a printer in a superposed state is disclosed. An identifier indicating a position where printing data is to be superposed on format data is contained in the format data in order to superpose the printing data on the format data with a predetermined positional relation therebetween. As soon as the identifier is read out in course of an operation for reading out the format data, the printing data is read out, and the read-out printing data is combined with the format data.

3 Claims, 9 Drawing Figures

CONTROL DEVICE FOR PRINTER WHICH HAS FUNCTION OF FORMAT DATA PRINTING

BACKGROUND OF THE INVENTION

The present invention relates to a control device for a printer which can print out format data and printing data in a superposed state, and more particularly to an improvement in positioning on printing paper between format data and printing data.

In a printer control device of format overlay type, format data read out of a memory is combined with printing data, and then sent to a printer to print the combined data at the same time. Accordingly, the above printer control device does not require that an operator replace printing paper in accordance with a desired format, though such a requirement is unavoidable in a method of printing variable information on printing paper, on which a format made up of ruled lines and characters is previously printed. These are described in U.S. Pat. No. 4,125,829.

FIG. 1 shows an example of documents to be printed. In FIG. 1, each of hatched areas indicates a printing area where printing data is printed, and the remaining area indicates a format. In general, several kinds of formats are stored in a memory, and one of the formats is selectively read out of the memory to be combined with the printing data.

In such a conventional printer control device of the format overlay type, line feed processing, column positioning processing and other types of processing have to be closely specified by a user program, in order to fit the printing position of the printing data to the format. For example, it has to be determined by a user program which line from the top of the document in FIG. 1 is selected and which character position from the left end of the selected line is used as the printing position for printing data indicating a "month". The printing position of printing data indicating a "year" is specified in the same manner as above, and so on. Further, it is required to alter programs each time the format of the document is changed.

SUMMARY OF THE INVENTION

It is an object of the present invention to provide a printer control device which can solve the above-mentioned problems and facilitate the positioning between format data and printing data when these data are combined with each other.

In a printer control device according to the present invention, field identifiers are inserted into format data to determine the printing position of printing data in the format. Each field identifier is placed at the head of each field where the printing data is to be outputted. When a field identifier is read out in a period of the format data being read out, the printing data begins to be outputted. The printing data does not include position information as to how the printing data is arranged on a document, but includes fields by which the printing data are discriminated from each other.

DESCRIPTION OF THE PREFERRED EMBODIMENT

Now, explanation will be made of an embodiment of a printer control device according to the present invention, based on the document 100 shown in FIG. 1. Format data is stored in the form of a set of fine horizontal lines such as TV scanning lines. Each line is stored in a format memory 3 in such a manner that white background portions on the line are expressed by a value "0" and black printing portions are expressed by a value "1". When, after several lines from the top have been read out, a line is traced from the left of the document 100 in FIG. 1, a field 101 indicated by hatched lines is found where a name is to be printed. A field identifier is placed at the head of the above field, and format data follows the field identifier. It is not required to specify the end of the field.

On the other hand, printing data is stored separately from the format data. In this example, a name, a number corresponding to the name, and other data is stored separately from the format data.

Figure 3:
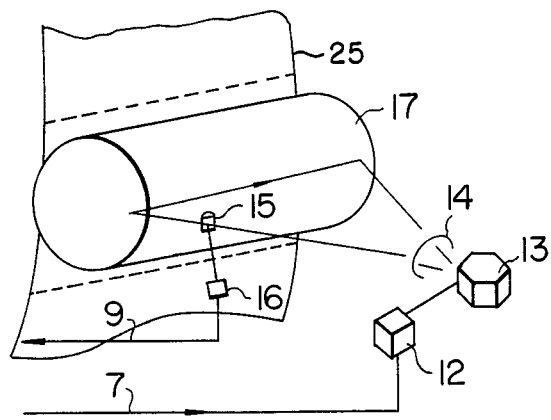
FIG. 3 is a diagrammatic perspective view showing a laser beam printer, to which the embodiment shown in FIG. 2 is applicable.

Format data is read out of the memory 3 in the order of the uppermost scanning line (namely, the first scanning line), second scanning line, third scanning line, and so on, and then is transferred to an output device, such as a laser beam printer 8, as shown in FIG. 3. When a field identifier is read out, it is indicated that the superposition of printing data on the format data is necessary, and, for example, name data stored separately from the format data is read out, combined with the format data and transferred to the output device. Accordingly, the printing data is superposed on the format data with an appropriate positional relation therebetween. As described previously, the printing data is not required to have information indicating a position on the document. However, for example, the "name" data and "month" data to be printed next are stored in a memory 2 in such a manner that these data can be discriminated from each other.

Figures 1, 2:
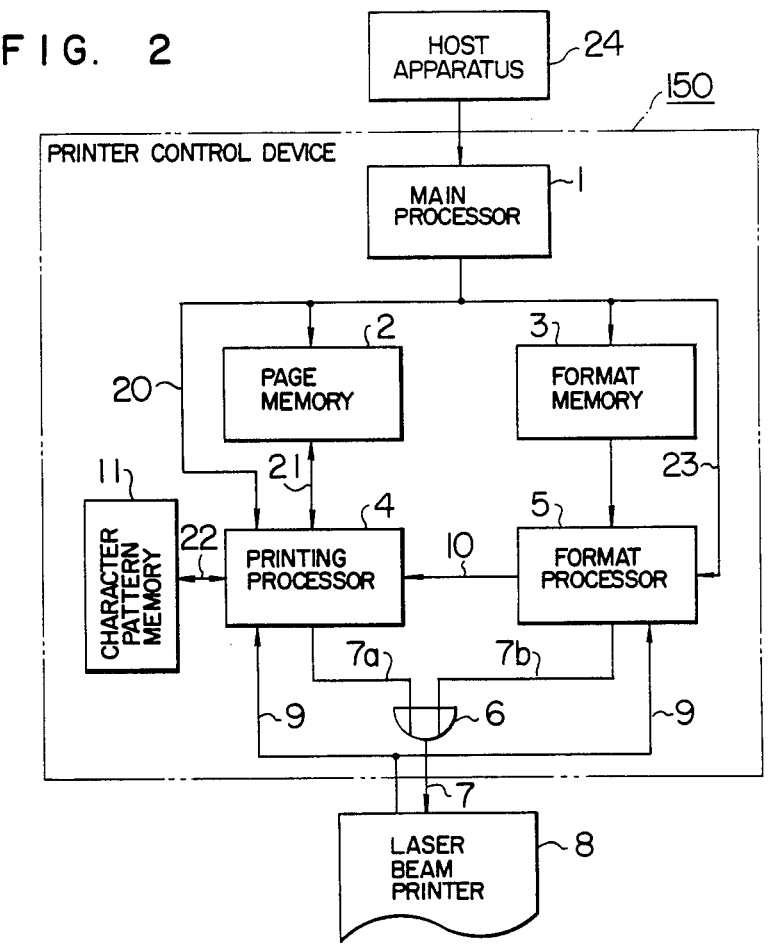
FIG. 1 shows an example of documents.
FIG. 2 is a block diagram showing the circuit configuration of an embodiment of a printer control device according to the present invention.

FIG. 2 is a block diagram showing an embodiment of a printer control device 150 according to the present invention. Referring to FIG. 2, a main processor 1 receives printing data and format data from a host apparatus 24, to store the printing data and the format data in a page memory 2 and a format memory 3, respectively. These data will be explained later in detail.

The page memory 2 and format memory 3 may be equal in structure to an ordinary memory, and data for each address is assigned to one byte in these memories 2 and 3. The page memory 2 can store therein printing character codes on about three pages of printing paper 25, and the format memory 3 can store therein format data on about eight pages of printing paper 25. The number of printing pages stored in each of the memories 2 and 3 is appropriately determined on the basis of the processing, capability of each of a host apparatus 24 and a printer such as laser beam printer 8, which is being used, and the data transfer rate between the host apparatus 24 and printer control device 150.

A printing processor 4 reads out printing data (that is, character codes) successively from the page memory 2 to read out corresponding character patterns from a character pattern memory 11, and generates a video signal 7a indicative of the character patterns in synchronism with a horizontal synchronizing signal 9 from a laser beam printer 8. A format processor 5 reads out format data successively from the format memory 3, and decodes the format data to generate a corresponding video signal 7b in synchronism with the horizontal synchronizing signal 9. When the format processor 5 detects a field identifier in the format data, a detection signal and information indicating a field number are sent, as an interrupt signal 10, to the printing processor 4. On receiving the interrupt signal 10, the printing processor 4 changes the field of printing data and reads out from the page memory 2 a printing data field having a field number identical with the field number of the format data. The above-mentioned operation will be explained later in more detail.

The video signals 7a and 7b are applied to an OR circuit 6, and a video signal 7 which is the logical sum of the signals 7a and 7b, is sent from the OR circuit 6 to the laser beam printer 8. Lines 20, 21, 22 and 23 transmit respective control signals or data.

Now, the laser beam printer 8 will be briefly explained, with reference to FIG. 3. In FIG. 3, reference numeral 17 designates a photo-sensitive drum, 12 a laser oscillator, 13 a rotating polygonal mirror, and 14 a lens. The laser oscillator 12 emits an intermittent laser beam in accordance with the video signal 7 from the printer control device. The laser beam is reflected from the rotating polygonal mirror 13, to scan the surface of the photo-sensitive drum 17. A printing process using the photo-sensitive drum 17 is similar to the printing process in an ordinary copying machine, and therefore the explanation of the former process will be omitted. Further, a reflecting mirror 15 is disposed in close proximity to one end of the photo-sensitive drum 17 to direct the laser beam to a beam detector 16. On detecting the laser beam, the beam detector 16 sends the horizontal synchronizing signal 9 to the printer control device 150.

Figure 4:
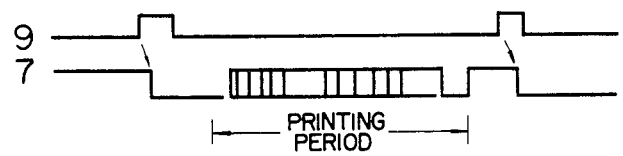
FIG. 4 is a time chart for explaining the operation of the laser beam printer shown in FIG. 3.

Next, a time relation between the horizontal synchronizing signal 9 and video signal 7 will be explained, with reference to FIG. 4. The printer control device 150 puts the video signal 7 in the ON-state (High-level in FIG. 4) at the beginning of the scanning operation for each scanning line, to generate the horizontal synchronizing signal 9. When a time has elapsed after the beginning of the scanning operation and the horizontal synchronizing signal 9 is sent out from the beam detector 16, the video signal 7 is put in the OFF-state (Low-level in FIG. 4) until start of a printing period. In the printing period, the printer control device 150 sends out, as the video signal 7, a dot pattern corresponding to printing data and format data. When the printing period has elapsed, the printer control device 150 keeps the video signal 7 at the OFF-state until the end of the scanning line. The above-mentioned ON-OFF control for the video signal 7 and the processing for forming the video signal 7 of the dot pattern are carried out by the format processor 5 and printing processor 4. Since the above control and processing are similar to those in an ordinary display device of raster scan type, detailed explanation thereof will be omitted.

Next, the format data will be explained. As mentioned previously, the format data is expressed by a large number of binary values "0" and "1". In order to compress the format data, it is given in the form of a combination of instructions. Each instruction has a length of two bytes, and the upper four bits of an instruction indicate what is expressed by the remaining bits (which are called an "operand"). Examples of the instruction are shown in the following table.

TABLE 1

| kind of instruction | meaning of operand |
|---|---|
| (0) in hexadecimal | indicates the number of successive "0's" by a hexadecimal number |
| (1) in hexadecimal | indicates the number of successive "1's" by a hexadecimal number |
| (2) in hexadecimal | indicates a combination pattern of "0" and "1" formed of 12 bits |
| (3) in hexadecimal | indicates the number of successive "0's" by a hexadecimal number and indicates the end of raster |
| (4) in hexadecimal | indicates the number of successive "1's" by a hexadecimal number and indicates the end of raster |
| (5) in hexadecimal | indicates a combination pattern of "0" and "1" formed of 12 bits and indicates the end of raster |
| (6) in hexadecimal | indicates a field number in hexadecimal |

Figure 5:
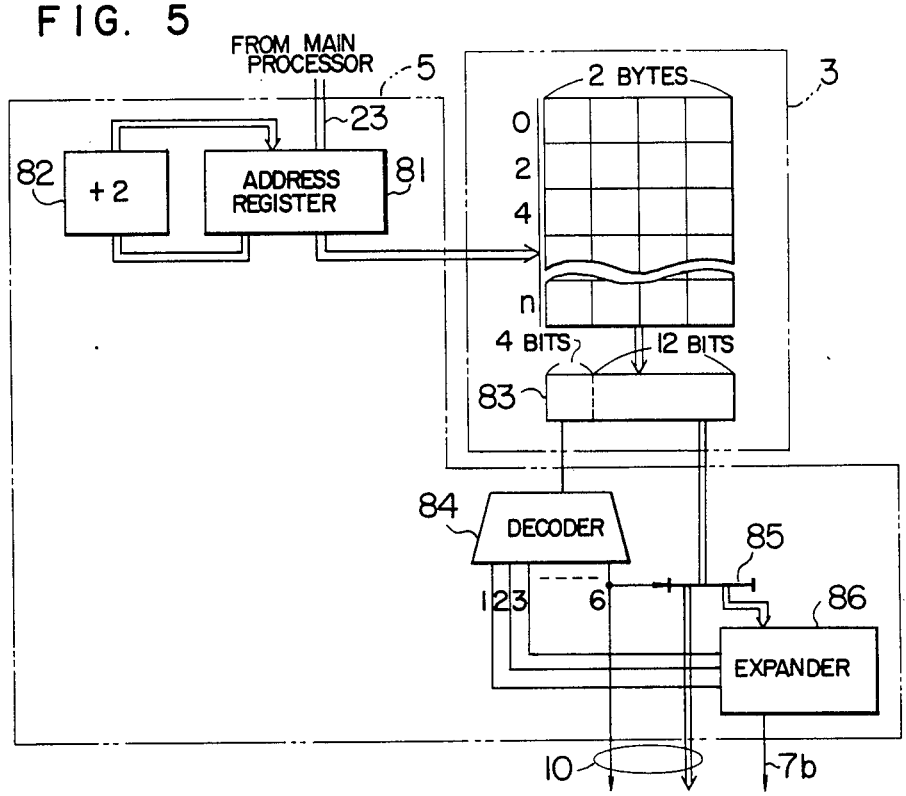
FIG. 5 is a diagrammatic view showing the detailed structure of the format memory and format processor shown in FIG. 2.

The format data on each scanning line is formed of a combination of instructions such as shown in the Table 1. The last instruction in the Table 1 is a field declaring instruction, and is used as a field identifier. On detecting the above instruction, the format processor 5 sends out the contents of the operand and a detection signal, as the interrupt signal 10, to the printing processor 4. Next, details of the format processor 5 will be explained, with reference to FIGS. 5 and 6. Several kinds of formats are usually stored in the format memory 3. An address on the format memory 3 where one of the formats is stored, is sent from the main processor 1 through line 23 to an address register 81, to be set therein.

Figure 6:
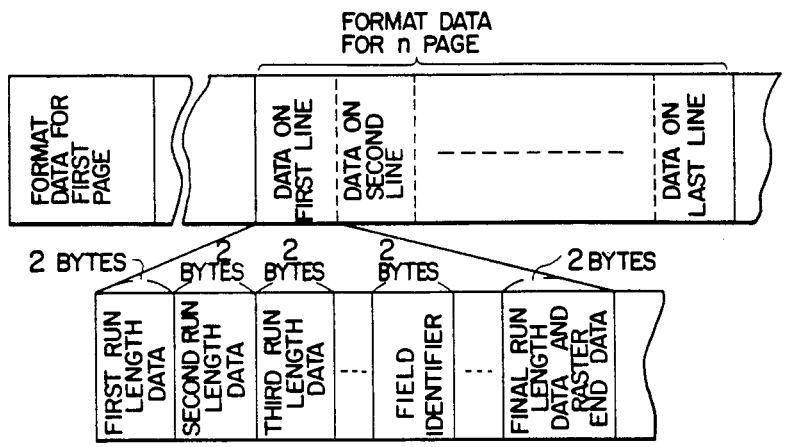
FIG. 6 shows a concrete example of format data.

FIG. 6 shows the storage state of format data in the format memory 3. The term "page" described in FIG. 6 indicates a format of one kind, and each format is made up of data on all of the first, second, . . . , and last lines. Further, data on each line is formed of a combination of the above-mentioned instructions each indicating compressed data. In the case where a printing field 101 is started in the course of a line, a field identifier is stored in the format memory 3 at a position corresponding to the starting point of the printing field 101. Now, let us consider the case where the format on the N-th page is specified. The head address of the specified format is set in the address register 81. Since each instruction is formed of two bytes, the contents of the address register 81 are incremented by two by an adder 82, each time one instruction is read out. The upper four bits of the read-out instruction are decoded by a decoder 84, and the kind of instruction (0), (1), (2), (3), (4), or (5) obtained as the result of decoding is sent to an expander 86. Meanwhile, the remaining bits (namely, the lower 12 bits) of the instruction in a register 83 are sent to the expander 86 through a selector 85, provided that the result of decoding does not indicate the kind (6). The lower 12 bits supplied to the expander 86 are expanded in accordance with one of the kinds (1) to (5). For example, when the result of decoding indicates the kind (0), the expander 86 delivers the video signal 7b having successive O's, the number of which is indicated by the 12-bit operand. Such compression and expansion of a signal based upon the run-length method is well known, and therefore a detailed explanation thereof will be omitted.

Further, when the result of decoding indicates the kind (6), it is determined that the field identifier is detected, and therefore the interrupt signal 10 is sent to the printing processor 4. In the present embodiment, the operand of the field identifier contains a field number, that is, information as to which of the first, second, . . . , and final printing fields 101 at the specified format is the present printing field 101. When the result of decoding indicates the kind (6), the selector 85 does not send the operand of the instruction to the expander 86, but the operand is sent to the printing processor 4 together with the result of decoding, to form part of the interrupt signal.

Figure 7:
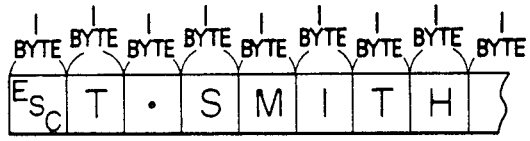
FIG. 7 shows an example of printing data.

FIG. 7 shows an example of a certain field of printing data stored in the page memory 2. The head character of such a field is an ESC code for separating the field from others, and character codes to be actually printed follow the ESC code.

On receiving the interrupt signal 10 from the format processor 5, the printing processor 4 reads out from the page memory 2 printing data having a field number identical with the field number included in the interrupt signal, and sends out a character pattern corresponding to the read-out character code, as the video signal 7a. Accordingly, when the format processor 5 detects the field identifier and delivers the interrupt signal 10, a series of characters T. SMITH shown in FIG. 7 are successively sent out, as the video signal 7a, from the printing processor 4. Meanwhile, the format processor 5 sends out a dot pattern according to the format data shown in FIG. 6, as the video signal 7b. The logical sum of the video signals 7a and 7b is sent to the laser beam printer 8, and thus the format specified by the format data and the characters specified by the printing data are printed with a correct positional relation therebetween.

Next, details of the printing processor 4 and those of the above-mentioned processing will be explained, with reference to FIGS. 8 and 9.

Figure 8:
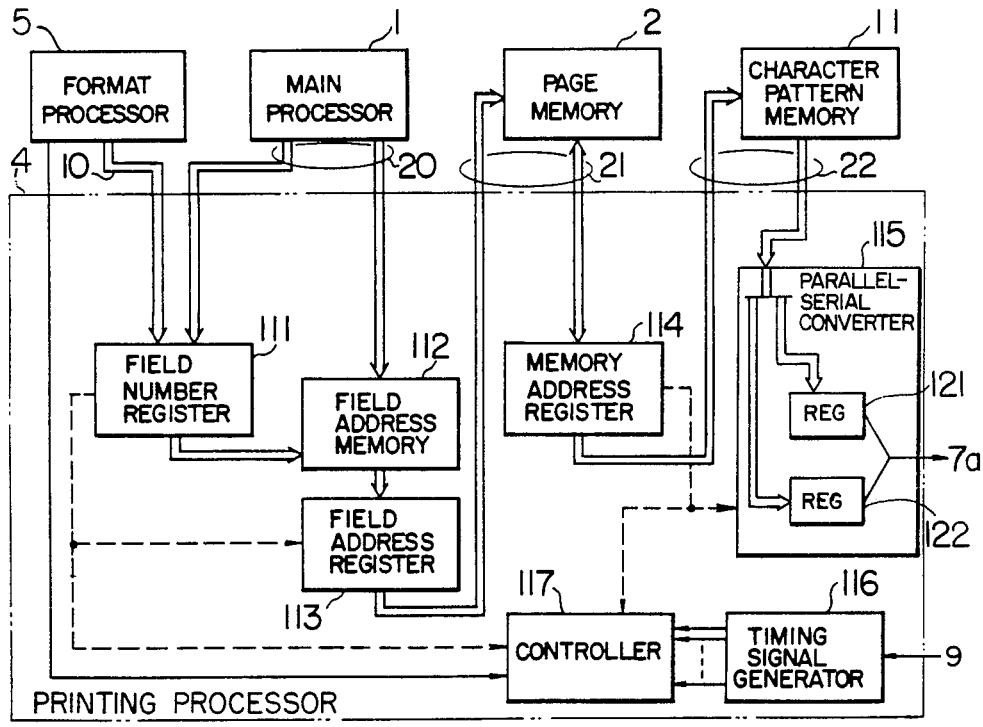
FIG. 8 is a block diagram showing the detailed circuit configuration of the printing processor shown in FIG. 2.

FIG. 8 is a block diagram showing the inner structure of the printing processor 4. In FIG. 8, reference numeral 111 designates a field number register for holding a field number from the format processor 5, and 112 a field address memory for storing therein the head address of each field of printing data stored in the page memory 2. The head addresses are transferred from main process 1 through line 20. A head address is set in a field address register 113 to access the page memory 2. The head address is supplied to the page memory 2 through line 21, and a readout address is transferred to a memory address register through line 21. Thus, a corresponding address in the character pattern memory 11 is read out from the page memory 2, to be set in a character pattern memory address register 114. Incidentally, the printing data indicates addresses on the character pattern memory 11. The character pattern memory 11 is accessed through line 22 on the basis of the address set in the memory address register 114, to read out a character pattern from the memory 11. The read-out character pattern is transferred to a parallel-serial converter 115 through line 22. The read-out character pattern is converted by the parallel-serial converter 115 into serial data, and then sent out as the video signal 7a. The converter 115 is a circuit for sending a character pattern to the laser beam printer 8 in a bit serial manner, and is formed of an ordinary parallel-serial converter. In more detail, the converter 115 includes two registers 121 and 122 each having a capacity to store a multiplicity of bits, the number of which is equal to the number of dots for expressing a portion of one horizontal scanning line occupied by a character pattern, and takes in a character pattern corresponding to the next character on a horizontal line during which a character pattern corresponding to the preceding character on the horizontal line is sent out to the laser beam printer 8 on line 7a. A timing signal generator 116 generates a timing signal for controlling various parts of the printing processor 4. The timing signal is synchronized by the horizontal synchronizing signal 9. The registers 111, 113 and 114, converter 115 and others are controlled by a controller 117 which is a program processor.

Figure 9:
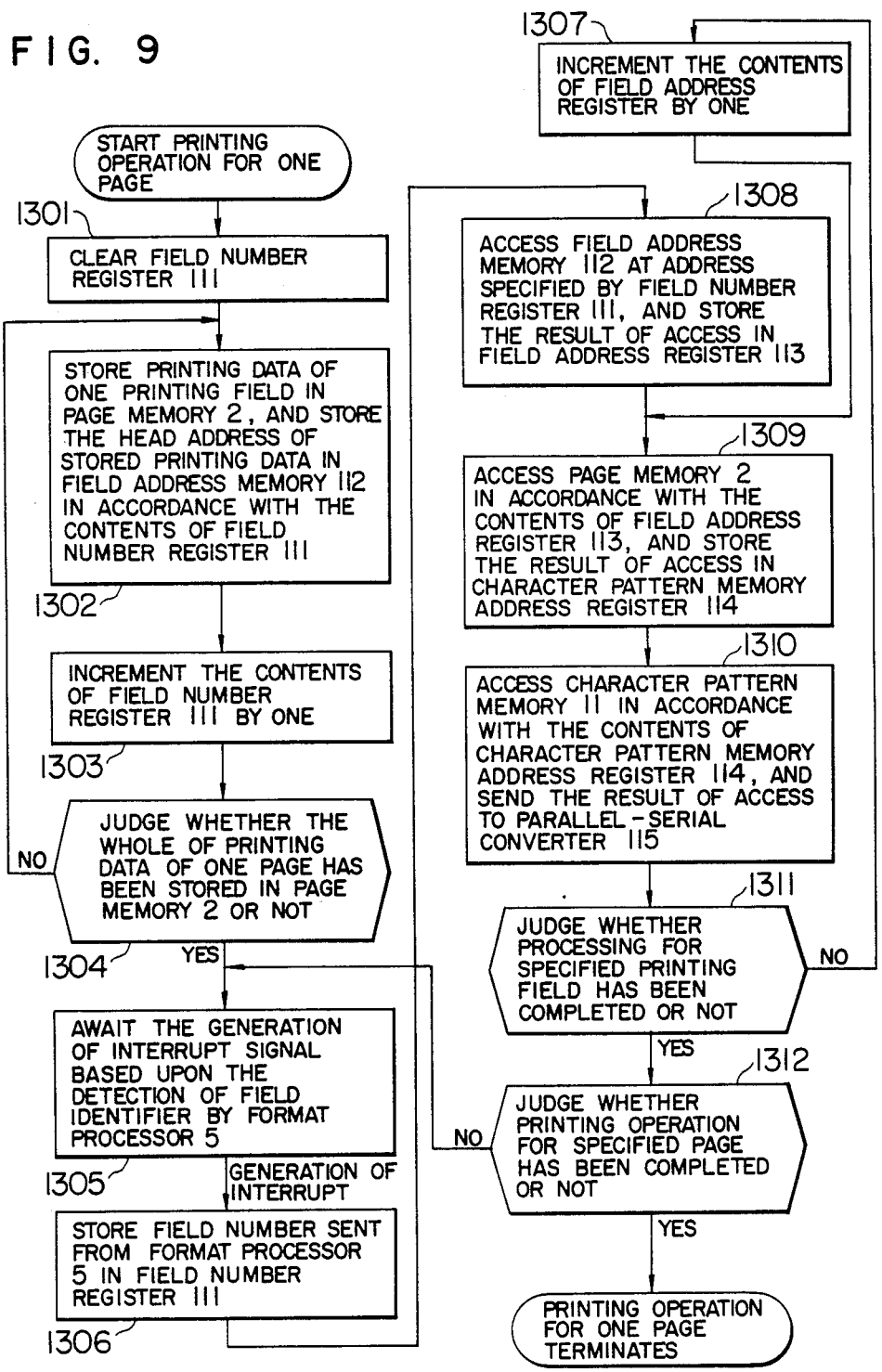
FIG. 9 is a flow chart showing the processing carried out by the printing processor shown in FIG. 8.

FIG. 9 is a flow chart for explaining the processing carried out by the printing processor 4. However, it is to be noted that the processing in steps 1301 to 1304 is carried out by the main processor 1. That is, the main processor 1 receives printing data from the host apparatus 24 to store page data in the page memory 2, and stores addresses on the page memory 2 where the head printing data of each printing field 101 is stored, in the field address memory 112 in order of field number. Accordingly, an address on the page memory 2 where printing data corresponding to a given field number is stored, can be known by referring to the field address memory 112.

Then, the processing in step 1305 and the following steps is carried out under the control of the controller 117.

In step 1305, the printing processor 4 waits till the interrupt signal 10 is generated on the basis of the detection of the field identifier by the format processor 5. When the interrupt signal is generated, a field number from the format processor 5 is set in the field number register 111 (step 1306). Next, a reading operation is performed for the field address memory 112 at the address specified by the field number register 111, and the readout result is set in the field address register 113 (step 1308). Then, the page memory 2 is accessed in accordance with the contents of the field address register 113, and the result of access is set in the character pattern memory address register 114 (step 1309). Next, the character pattern memory 11 is accessed to read out pattern information, which is sent to the parallel-serial converter 115. At the same time as the reading operation for the character pattern memory 11, the contents of the character pattern memory address register 114 are incremented by an amount corresponding to a portion of a horizontal scanning line occupied by a character pattern, and the contents thus increased are stored in the page memory 2 (step 1310). Accordingly, the second line of the character pattern is addressed in a next scan line. The page memory 2 and character pattern memory 11 are operated in the same manner as an ordinary device for generating a character pattern by the raster scan method. By the above-mentioned processing, a pattern on a scanning line, on which the first character of the specified field is present, is sent out.

Next, it is checked whether the whole of printing data of the specified field has been outputted or not (step 1311). When all of characters included in the specified field are not outputted, the contents of the field address register 113 are incremented by an amount corresponding to one character (step 1307), and the processing in steps 1309 and 1310 is repeated for the next character. It is judged by the detection of the ESC code (shown in FIG. 7) of the next field that the whole of printing data of the specified field has been outputted.

When the whole of printing data of the specified field has been outputted, it is judged whether the printing operation for one page has been completed or not (step 1312). When the printing operation is not completed, the processing is returned to step 1305.

For example, in the case where one character is placed on ten lines, the same field identifier as in the first line is detected at a corresponding position on the second line (for example, the second line of a "name" field), and the same processing as mentioned above is carried out. Such processing is repeated until all of the patterns on ten lines are outputted, to complete the printing of the name. When the whole of printing data for one page has been outputted, the printing operation is completed.

As is apparent from the foregoing explanation, according to the present invention, cumbersome processing for starting a new-line at a position specified by a format and for specifying a column is not required in a program for outputting printing data, and therefore the program can be greatly improved.

I claim:

1. A printer control device for outputting format data and printing data in a superposed state, comprising:

a first memory for storing printing data;

a second memory for storing format data, said format data containing control information indicative of a position where said printing data is superposed on said format data;

first control means for reading out said format data from said second memory to generate a first video signal, and generating a control signal when said control information is read out;

second control means responsive to said control signal for reading out said printing data from said first memory to generate a second video signal; and superposing means for outputting said first and second video signals.

2. A printer control device according to claim 1, wherein said printing data is superposed on a plurality of fields included in said format data and said control information contains field specifying information for specifying one of said fields, and wherein said second control means further receives said field specifying information to selectively read out printing data which is to be superposed on said format data at a specified field, thereby generating said second video signal.

3. A printer control device according to claim 2, wherein said second control means includes a register for holding said field specifying information, a third memory for storing addresses on said first memory where printing data to be superposed on said format data at said fields are stored, in such a manner that said addresses can be read out in accordance with said field specifying information, and third control means for reading out printing data from said first memory in accordance with an address read out of said third memory.

* * * * *